United States Patent
Franaszek et al.

(10) Patent No.: US 6,341,325 B2
(45) Date of Patent: *Jan. 22, 2002

(54) METHOD AND APPARATUS FOR ADDRESSING MAIN MEMORY CONTENTS INCLUDING A DIRECTORY STRUCTURE IN A COMPUTER SYSTEM

(75) Inventors: Peter A. Franaszek, Mount Kisco; John T. Robinson, Yorktown Heights, both of NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/229,057

(22) Filed: Jan. 12, 1999

(51) Int. Cl.$^7$ ............................................. G06F 12/02
(52) U.S. Cl. .......................... 711/3; 711/220; 711/221
(58) Field of Search ................... 711/153, 171, 711/172, 173, 205, 207, 3, 220, 221

(56) References Cited

U.S. PATENT DOCUMENTS

| | | | |
|---|---|---|---|
| 4,985,920 A | * 1/1991 | Seki | 713/193 |
| 5,119,291 A | * 6/1992 | Flannagan et al. | 395/275 |
| 5,729,228 A | 3/1998 | Franaszek et al. | 341/106 |
| 5,761,536 A | 6/1998 | Franaszek | 395/888 |
| 5,864,859 A | 1/1999 | Franaszek | 707/101 |
| 5,873,118 A | * 2/1999 | Letwin | 711/156 |
| 5,974,471 A | * 10/1999 | Belt | 710/1 |
| 6,085,201 A | * 7/2000 | Tso | 707/505 |
| 6,141,767 A | * 10/2000 | Hu et al. | 714/1 |

* cited by examiner

*Primary Examiner*—Hiep T. Nguyen
(74) *Attorney, Agent, or Firm*—Scully, Scott, Murphy & Presser; Robert P. Tassinari, Esq

(57) ABSTRACT

A system for accessing contents of the directory structure in a computing system having a CPU and implementing indirectly addressable main memory via a first directory structure included in the memory. In this system, CPU generated real memory addresses are translated to one or more physical memory locations using the directory structure. A second directory structure is provided in main memory that includes one or more entries with each entry formatted to provide addressability to a predetermined number of entries in the first directory structure. The second directory structure alternately may access all contents of main memory, and is adaptable as main memory capacity varies. The second directory structure may alternately be implemented as a hardware device which computes the addresses for accessing data in main memory.

20 Claims, 6 Drawing Sheets

METHOD AND APPARATUS FOR ADDRESSING MAIN MEMORY CONTENTS INCLUDING A DIRECTORY STRUCTURE IN A COMPUTER SYSTEM

FIELD OF THE INVENTION

The present invention relates generally to memory addressing schemes in computer systems, and specifically, to a system and method for enabling computer processors and CPUs to access data contents of main memory systems in which main memory is addressed by means of hardware translations of real addresses using a directory structure stored in the main memory.

BACKGROUND OF THE INVENTION

An emerging development in computer organization is the use of data compression in a computer system's main memory, such that each cache line may be compressed before storage in main memory. The result is that cache lines, which in conventional computer systems that do not use main memory compression are of a uniform fixed size in the main memory, now, using memory compression, occupy varying amounts of space. Techniques for efficiently storing and accessing variable size cache lines in main memory can be found in U.S. Pat. No. 5,761,536, and in co-pending U.S. patent application Ser. No. 08/603,976, entitled "COMPRESSION STORE ADDRESSING", both assigned to the assignee of the present invention, and in the reference entitled "Design and Analysis of Internal Organizations for Compressed Random Access Memories," by P. Franaszek and J. Robinson, IBM Research Report RC 21146, IBM Watson Research Center, Mar. 30, 1998.

Techniques for efficiently storing and accessing variable size cache lines require the use of a directory structure, in which real memory addresses generated by the CPU(S) (or processors) of the computer system are used to index into the directory, which is then used to find the main memory contents containing the compressed data. An example of a compressed main memory system and directory structure is now described with reference to FIGS. 1–3.

FIG. 1 shows the overall structure of an example computer system using compressed main memory. A CPU 102 reads and writes data from a cache 104. Cache misses and stores result in reads and writes to the compressed main memory 108 by means of a compression controller 106.

FIG. 2 shows in more detail the structure of the cache 104, components of the compression controller 106, and compressed main memory 108 of FIG. 1. The compressed main memory is implemented using a conventional RAM memory M 210, which is used to store a directory D 220 and a number of fixed size blocks 230. The cache 240 is implemented conventionally using a cache directory 245 for a set of cache lines 248. The compression controller 106 includes a decompressor 250 which is used for reading compressed lines and a compressor 260 which is used for writing compressed lines. Each cache line is associated with a given real memory address 270. Unlike a conventional memory, however, the address 270 does not refer-to an address in the memory M 210; rather, the address 270 is used to index into the directory D 220. Each directory entry contains information (shown in more detail in FIG. 3) which allows the associated cache line to be retrieved. For example, the directory entry 221 for line 1 associated with address A1 271 is for a line which has compressed to a degree in which the compressed line can be stored entirely within the directory entry; the directory entry 222 for line 2 associated with address A2 272 is for a line which is stored in compressed format using a first full block 231 and second partially filled block 232; finally the directory entries 223 and 224 for line 3 and line 4 associated with addresses A3 273 and A4 274, respectively, are for lines stored in compressed formats using a number of full blocks (blocks 233 and 234 for line 3 and block 235 for line 4) and in which the remainders of the two compressed lines 3 and 4 have been combined in block 236.

FIG. 3 shows some examples of directory entry formats. For this example, it is assumed that the blocks 230 of FIG. 2 are of size 256 bytes and that the cache lines 248 of FIG. 2 are of size 1024 bytes. This means that lines can be stored in an uncompressed format using four blocks. For this example, directory entries of size 16 bytes are used, in which the first byte consists of a number of flags; the contents of the first byte 305 determine the format of the remainder of the directory entry. A flag bit 301 specifies whether the line is stored in compressed or uncompressed format; if stored in uncompressed format, the remainder of the directory entry is interpreted as for line 1 310, in which four 30-bit addresses give the addresses in memory of the four blocks containing the line. If stored in compressed format, a flag bit 302 indicates whether the compressed line is stored entirely within the directory entry; if so, the format of the directory entry is as for line 3 330, in which up to 120 bits of compressed data are stored. Otherwise, for compressed lines longer than 120 bits, the formats shown for line 1 310 or line 2 320 may be used. In the case of the line 1 310 format, additional flag bits 303 specify the number of blocks used to store the compressed line, from one to four 30-bit addresses specify the locations of the blocks, and finally the size of the remainder, or fragment, of the compressed line stored in the last block (in units of 32 bytes), together with a bit indicating whether the fragment is stored at the beginning or end of the block, is given by four fragment information bits 304. Directory entry format 320 illustrates an alternative format in which part of the compressed line is stored in the directory entry (to reduce decompression latency); in this case, addresses to only the first and last blocks used to store the remaining part of the compressed line are stored in the directory entry, with intervening blocks (if any) found using a linked list technique, that is each blocked used to store the compressed line has, if required, a pointer field containing the address of the next block used to store the given compressed line.

In contrast, in conventional computer systems that do not use compressed main memory, real memory addresses are used directly as main memory addresses. In compressed main memory systems, the mapping using the directory to the data containing the compressed cache line contents occurs automatically using compression controller hardware, and the directory is "invisible" to the processor(s); that is, there is no way (using conventional processor architectures) for processors to access the directory contents. However, it is desirable for a variety of reasons to provide such access. One approach is to modify the processor architecture, so that, for example, addressing modes that bypass the compression controller hardware and allow direct examination of main memory contents are made available. Although this provides a solution to the problem, clearly it has a number of drawbacks, for example, it may not be possible to use "off-the-shelf" processors using existing processor architectures in this approach.

Even assuming that an additional addressing mode, which could be termed an "R=P" (real=physical) mode, is available, which bypasses the hardware translation of real memory addresses to physical memory locations using the directory structure, there is the following problem: after switching to this mode, all cache contents in all cache levels of the computer system become invalid, since the cache contents under normal operation reflect the contents of main memory as addressed using the translation of real memory addresses to physical locations via the directory structure. Therefore, in order to switch to this mode, all modified cache lines in all cache levels must first be forced to be written through to main memory, and then all cache lines in all cache levels must be marked invalid. A similar process must occur for correct operation which switching out of R=P mode. Thus, switches between R=P mode and normal addressing modes represent significant processing time overheads. Furthermore, in a multiprocessor system there may be significant problems associated with cache coherence protocols in the case that one processor is operating in R=P mode and remaining processors are operating in normal addressing modes.

It would be highly desirable to provide an apparatus and method for enabling processors and CPUs direct access to the directory structure of compressed main memory systems in indirectly addressed main memory architectures, as well as other applications of indirectly addressed main memory architectures (for example, fault-tolerant main memory designs).

Furthermore, it would be highly desirable to provide a system and method for enabling processors to directly access main memory contents of compressed memory systems without the necessity of modifying existing processor architectures, and without the requirement of introducing new addressing modes.

SUMMARY OF THE INVENTION

The present invention is directed to a two-tier directory structure and addressing scheme that enables direct processor or CPU access to the directory structure used to implement compressed main memories (and/or fault-tolerant memories), in systems in which the lowest level of the main memory hierarchy is addressed indirectly. Particularly, a second level directory is employed which contains entries that refer to the blocks of memory containing the (first level) directory, thus allowing for direct examination of the directory contents, for hardware debugging and performance monitoring applications. It additionally makes feasible designs in which the processor(s) may manage memory contents by software (as opposed to purely hardware-managed memory), which may reduce the expense of compressed main memory or fault-tolerant memory systems.

Additionally, according to the invention, a second level directory is logically implemented as a part of memory at a given set of memory addresses but is not physically contained in memory. That is, results of memory references to the given set of memory addresses are determined by hardware means which computes the logical contents of each such logical memory address.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE INVENTION

Figure 1:
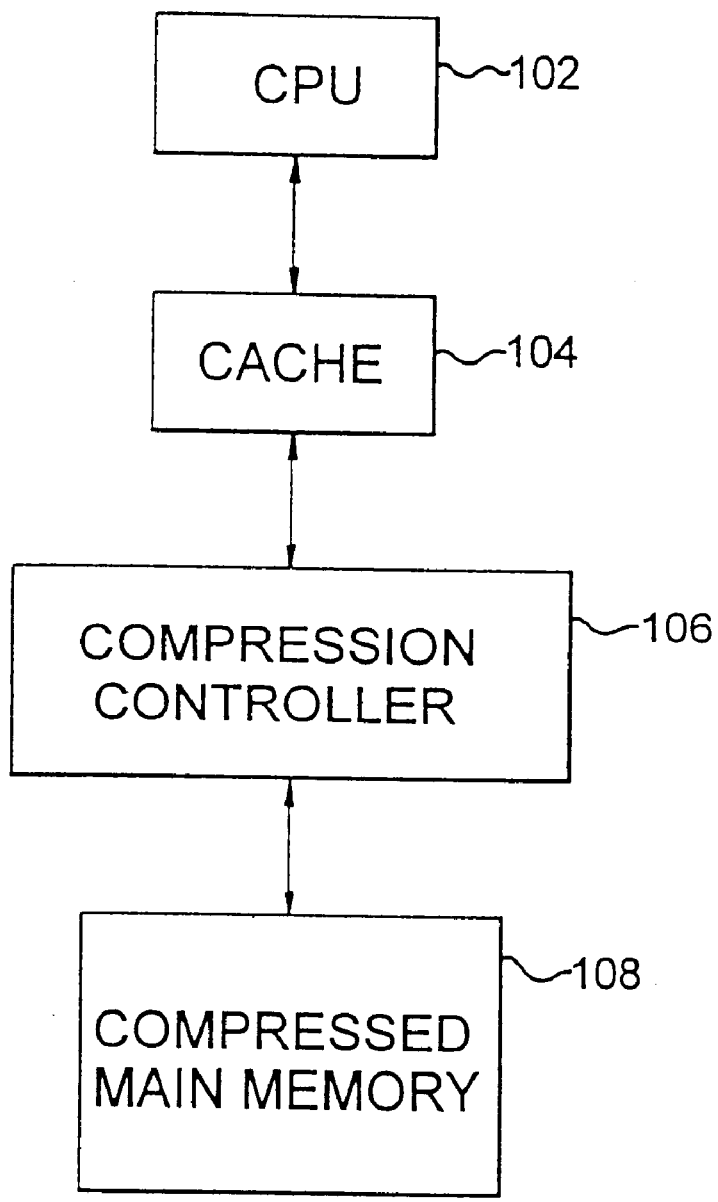
FIG. 1 illustrates generally a conventional computer system implementing compressed main memory.
Figure 2:
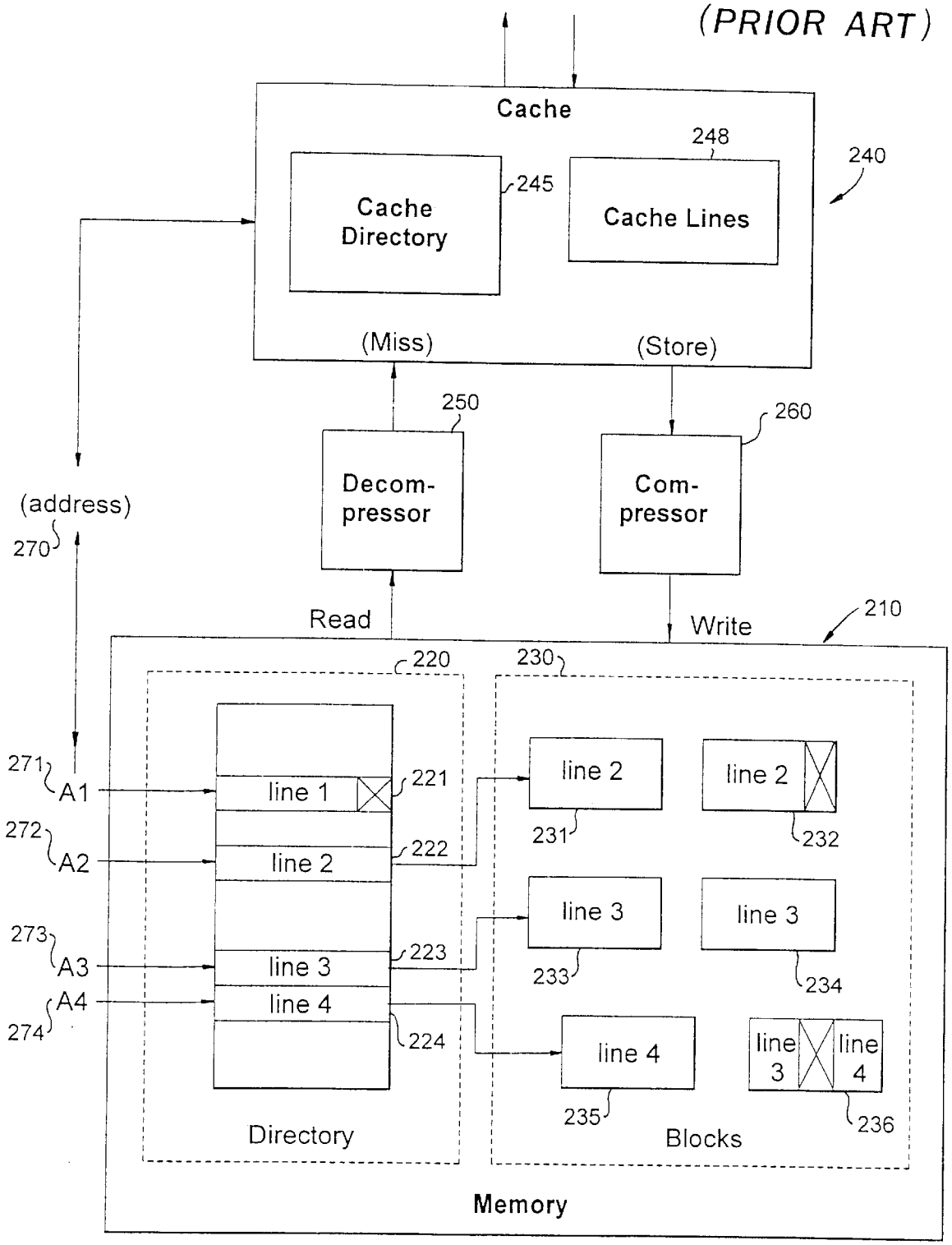
FIG. 2 illustrates a conventional compressed main memory system organization.

One method of the invention for providing addressability to the directory structure of compressed main memory systems is now described in more detail. Referring back to FIGS. 1 and 2, it should be noted that real addresses generated by the CPU 102 (FIG. 1) are, in the case of misses to the cache 104, automatically translated by the compression controller 106 using the directory D 220 (FIG. 2) to access compressed data in a directory entry, compressed data in one or more blocks 230, or uncompressed data in blocks 230. Thus, as shown so far, there is no way for the CPU to access that part of the memory M 210 containing the directory D 220.

Figure 3:
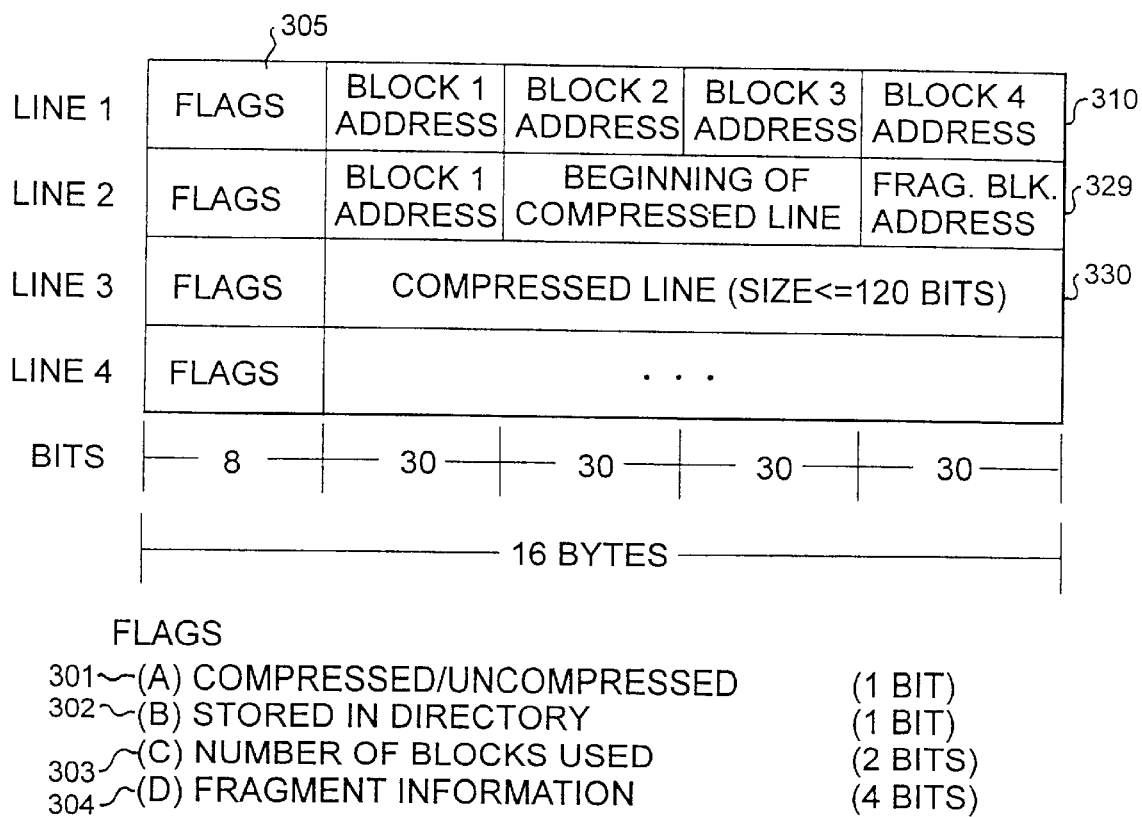
FIG. 3 depicts examples of directory entry formats for the compressed main memory system of FIG. 2.
Figure 4:
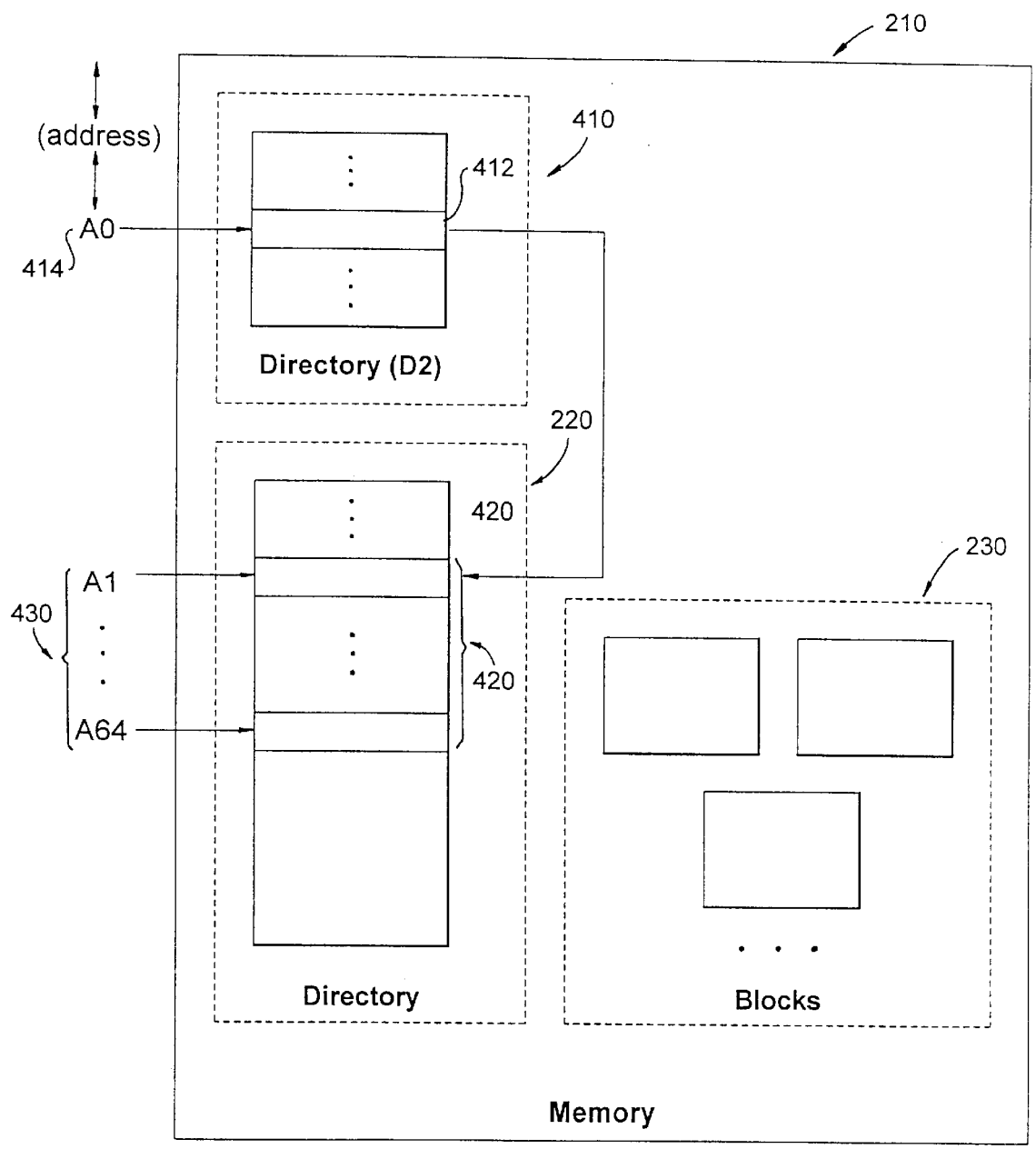
FIG. 4 illustrates the apparatus for addressing compressed main memory contents according to a first embodiment of the invention.

According to a first embodiment of the invention, as shown in FIG. 4, one way to provide addressability to D 220 is to use a second level directory D2 410 which contains a number of directory entries which have been formatted so as to provide addressability to all of D 220 in uncompressed form. That is, in each such directory entry, the compressed flag 301 shown in the formatted directory entry of FIG. 3 is set to "uncompressed", and the four block addresses 310 are set to point to a sequence of four consecutive blocks of memory in D 220. With directory entry formats, block sizes and so on as described with respect to the examples shown in FIG. 3, each directory entry provides addressability to 1024 bytes, directory entries are of size 16 bytes, therefore, each second level directory entry provides addressability to 1024/16=64 directory entries in D 220. This is illustrated in FIG. 4, in which a D2 410 directory entry 412 corresponding to address A0 414 provides addressability to 64 consecutive directory entries 420 in D 220 corresponding to addresses A1 through A64 (430). Therefore, the CPU 102 can access the 1024 bytes of memory containing the directory entries corresponding to addresses A1 through A64 (430) by means of address A0 414.

Figure 5:
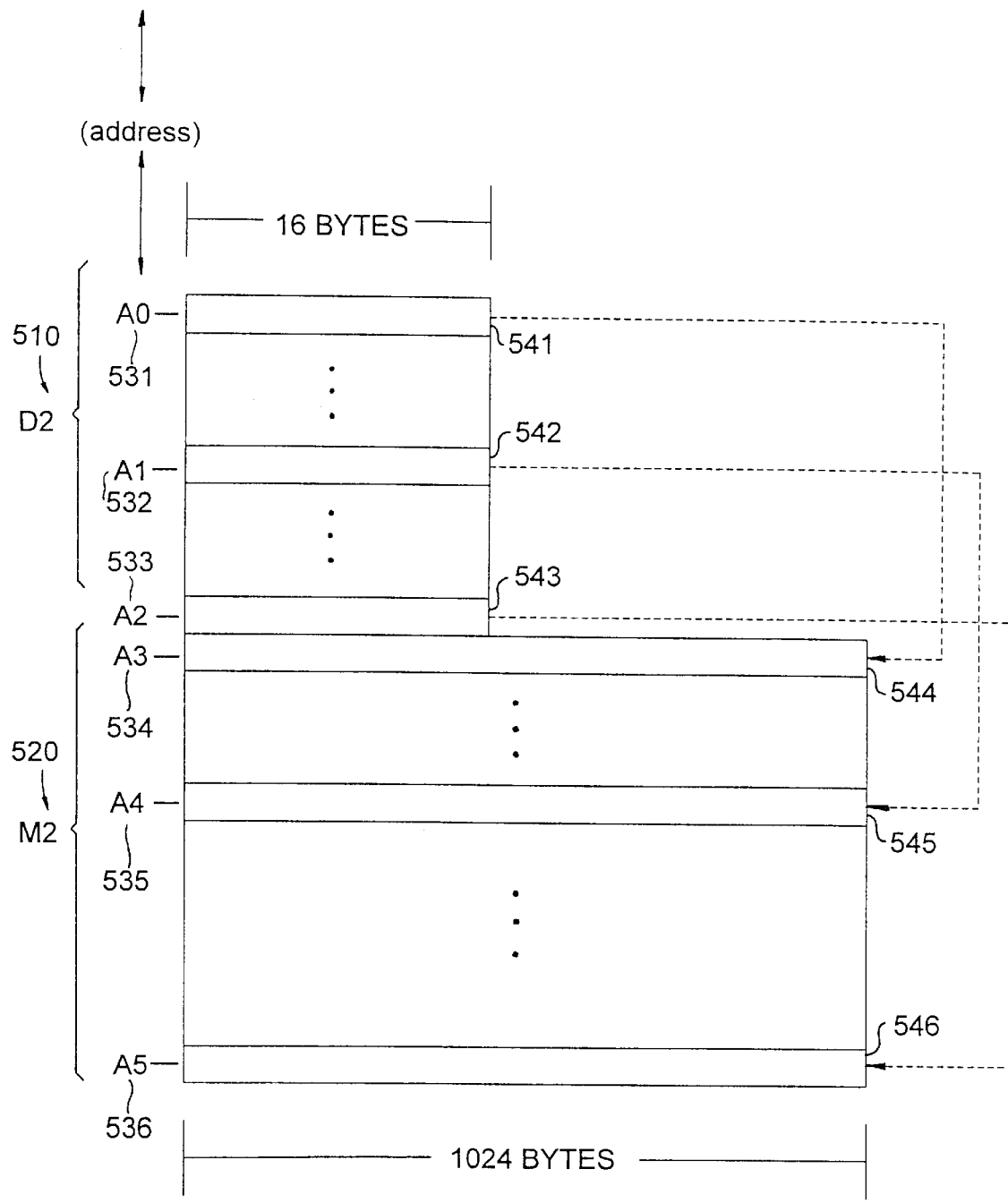
FIG. 5 illustrates the apparatus for addressing compressed main memory contents according to a second embodiment of the invention.

Previous examples have illustrated a static directory structure for the first level directory D 220, that is D 220 consists of a pre-allocated contiguous area of memory. An alternative approach for compressed main memory systems is to use a dynamic directory structure in which, for example, the directory can grow by allocating a 256 byte block 230 for use not as data, but rather for 16 additional 16 byte directory entries (which allows addressability for 16K bytes of data, that is, four 4K byte pages, which is a typical page size in many current computer systems). When additional memory addressability is provided in this fashion, this is recorded by modification of the operating system's page tables, using an operating system that has been designed to allow the total logical main memory size to vary. Alternatively, reducing the logical main memory size, by means of de-allocating a block 230 containing directory entries and appropriate modification of page tables, is also possible. In such an approach, the directory D 220 is not necessarily in a given memory area known beforehand, but rather may occupy a number of blocks allocated throughout main memory M 210. In order to provide addressability to the first level directory in this case, a second method of the invention is illustrated in FIG. 5. In the system illustrated in FIG. 5, D2 510 is used to provide direct addressability to all of memory, in effect bypassing the first level directory and compression/decompression. FIG. 5 shows all of memory, which consists of a first part D2 510 consisting of a number of directory entries, e.g., 16 byte entries, and a second part M2 consisting of a number of memory areas, e.g., each of 1024 bytes. As shown, directory entry 541 corresponding to address A0 531 provides addressability to the first 1024 bytes of memory 544 at address A3 534; directory entry 542 corresponding to address A1 532 provides addressability to 1024 bytes of memory 545 at address A4 535; and directory entry 543 corresponding to address A2 533 provides addressability to the last 1024 bytes of memory 546 at address A5 536.

Figure 6:
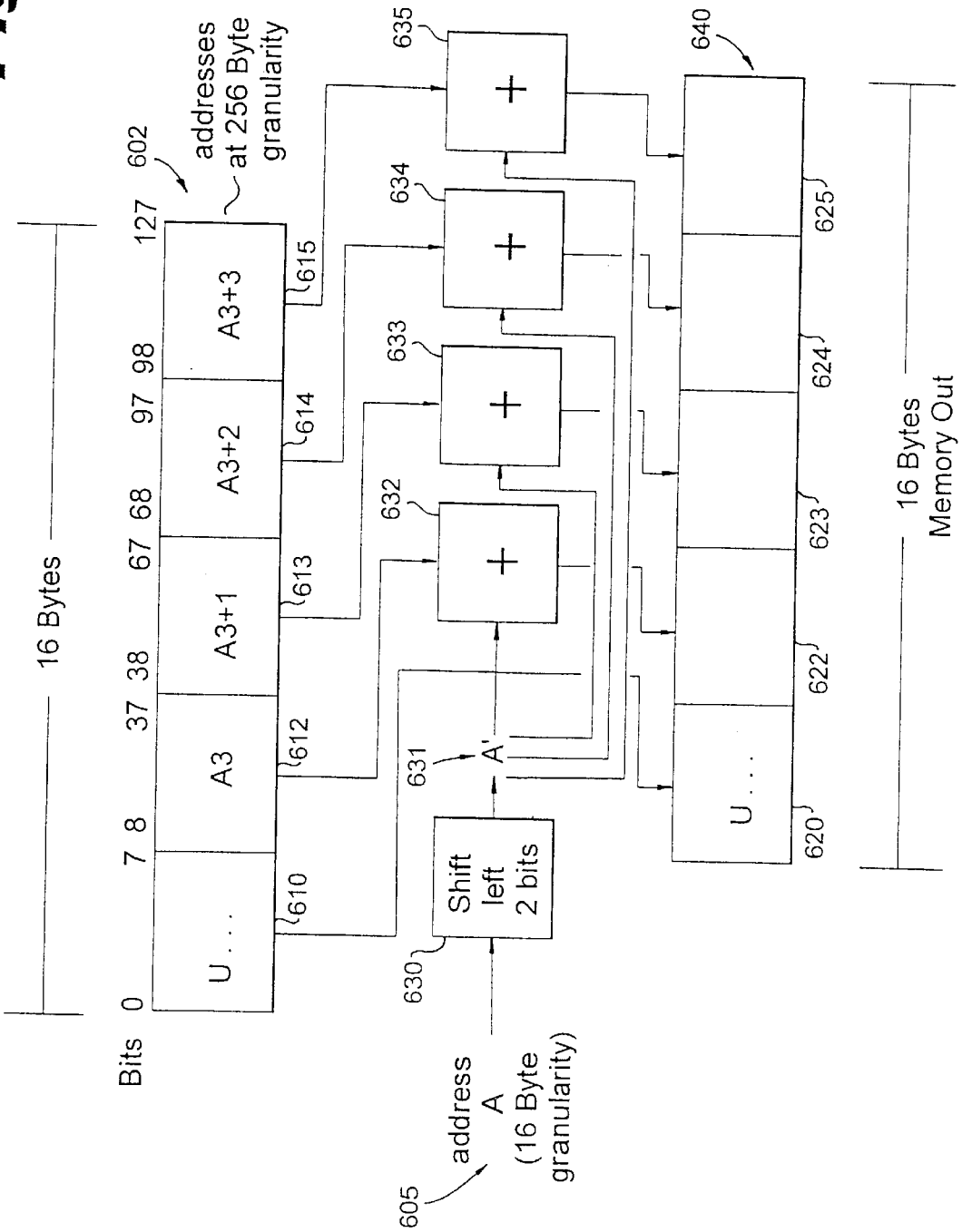
FIG. 6 illustrates a hardware approach for accessing compressed main memory contents of computer systems.

A second level directory as previously described can be implemented using conventional RAM, in which the contents of the second level directory are loaded during a system boot process, or by means of ROM (since the contents of the second level directory do not change). Alternatively, the results of memory accesses to the second level directory can be computed by specialized hardware, as illustrated in FIG. 6. In this example, the method illustrated by means of FIG. 5 is assumed; and the directory entry formats are as shown in FIG. 3. Referring to FIG. 6, a read-only register 602 is loaded with a "template" directory entry in which the flags field 610 has the uncompressed bit set and the block address fields 612, 613, 614, 615 are loaded with the addresses of the four consecutive 256 byte blocks in the first 1024 byte memory area 544 (see FIG. 5) at address A3 534. The memory address A 605 is assumed to be at 16 byte granularity; that is, A+1 refers to the next 16 byte entry, etc. (for this example, for simplicity, it is assumed that the first second level directory entry is at address A=0; modifications for other base addresses are straightforward). Since each consecutive second level directory entry refers to four consecutive blocks, it is necessary to multiply A by 4, which is accomplished by means of a shift register 630 which shifts address A left by 2 bits. The result A' 631 is added to the contents of the "template" directory entry block addresses by means of adders 632, 633, 634, 635, and loaded into the corresponding fields 622, 623, 624, 625 in the memory out register 640. Finally, the contents of the flags fields 620 are loaded directly into the memory out register 640 from the directory entry "template" flags fields 610. Thus, this example illustrates an alternative implementation in which no RAM or ROM memory is required for the second level directory; instead, the results of memory accesses to the second level directory are computed using hardware mechanisms.

This invention allow processor(s) to access the directory structure used to implement compressed main memories (and/or fault-tolerant memories), in systems in which the lowest level of the main memory hierarchy is addressed indirectly. This allows examination of the directory contents, for hardware debugging and performance monitoring applications, and also makes feasible some designs in which the processor(s) manage memory contents by means of software (as opposed to purely hardware-managed memory), which could reduce the expense of compressed main memory or fault-tolerant memory systems.

Although a detailed description is provided for the case of indirectly addressed main memory as used in a compressed main memory system, it should be understood that the invention can also be used for other applications of indirectly addressed main memory.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. In a computer system having a CPU and implementing main memory for storing compressed and uncompressed data, said memory accessible by means of a first directory structure included in said memory, wherein CPU generated real memory addresses are translated to one or more physical memory locations using said first directory structure in a manner transparent to said CPU, a system for accessing contents of the first directory structure comprising a second directory structure provided in main memory, said second directory structure including one or more entries with each entry formatted to provide addressability to a predetermined number of entries in said first directory structure and enable direct access to contents of said entries by said CPU, said second directory structure responsive to said CPU generated real memory addresses.

2. The computer system as claimed in claim 1, wherein said first directory structure comprises pre-allocated, contiguous areas of memory, each entry of said second directory structure providing addressability to a plurality of consecutive entries in said first directory structure.

3. The computer system as claimed in claim 1, wherein data in said main memory is compressed.

4. The computer system as claimed in claim 2, wherein said first directory structure is of fixed size having entries at a fixed set of memory locations.

5. The computer system as claimed in claim 1, wherein said CPU generated real memory addresses are translated by a compression controller device.

6. The computer system as claimed in claim 1, wherein said first directory entry includes one or more flag indicators specifying the format of data remaining in the first directory entry.

7. The computer system as claimed in claim 6, wherein a first flag indicator in a first directory entry specifies whether data in said entry is stored in one of compressed and uncompressed form.

8. The computer system as claimed in claim 7, wherein when a first flag indicates that said data in said entry is stored in compressed form, a second flag indicates whether the compressed data is entirely stored in said entry.

9. The computer system as claimed in claim 8, wherein when a second flag indicates that the compressed data is not entirely stored in said entry, a third flag indicates a size of the remaining compressed data.

10. In a computer system having a CPU and implementing memory for storing compressed and uncompressed data, said memory accessible by means of a first directory structure included in said memory wherein CPU generated real memory addresses are translated into one or more physical memory locations using said first directory structure in a manner transparent to said CPU, a system for accessing all memory locations of said memory comprising a second directory structure including one or more entries with each entry formatted to provide addressability to a predetermined segment of said memory, said second directory providing said CPU with direct access to all contents of said memory including contents of said first directory structure.

11. The computer system as claimed in claim 10, wherein said first directory structure is capable of varying in size.

12. The computer system as claimed in claim 10, wherein said second directory structure is part of said memory, and contents of said second directory structure are loaded during a system boot process.

13. The computer system as claimed in claim 10, wherein said second directory structure comprises ROM.

14. The computer system as claimed in claim 10, wherein said CPU generated real memory addresses are translated by a compression controller device.

15. The computer system as claimed in claim 10, wherein said first directory entry includes one or more flag indicators specifying the format of the remaining directory entry.

16. The computer system as claimed in claim 15, wherein a first flag indicator in a first directory entry specifies whether data in said entry is stored in one of compressed and uncompressed form.

17. The computer system as claimed in claim 16, wherein when a first flag indicates that said data in said entry is stored in compressed form, a second flag indicates whether the compressed data is entirely stored in said entry.

18. The computer system as claimed in claim 17, wherein when a second flag indicates that the compressed data is not entirely stored in said entry, a third flag indicates a size of the remaining compressed data.

19. The computer system as claimed in claim 10, wherein said second directory structure is implemented by a hardware mechanism comprising:

first read-only register device loaded with predetermined base address directory template including block address fields corresponding to consecutive blocks in said memory to be accessed, each said block address field being at a predetermined granularity;

means for receiving a memory address from said CPU for addressing said memory;

means for multiplying said address by a predetermined number according to said predetermined granularity;

one or more adder devices for adding a multiplied address result to each respective block address fields of said directory template; and a memory output register for receiving consecutive results of said additions, wherein said memory out register provides addressability to a memory location in said memory.

20. The computer system as claimed in claim 19, wherein said means for multiplying includes a bit-shifting device.

* * * * *